US008626741B2

(12) United States Patent
Vijayakumar et al.

(10) Patent No.: US 8,626,741 B2
(45) Date of Patent: Jan. 7, 2014

(54) PROCESS FOR CATALOGING DATA OBJECTS BACKED UP FROM A CONTENT ADDRESSED STORAGE SYSTEM

(75) Inventors: Bala Vijayakumar, San Jose, CA (US); Suman Tokuri, Bangalore (IN); Ramachandaran Srinivasan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 482 days.

(21) Appl. No.: 11/818,576

(22) Filed: Jun. 15, 2007

(65) Prior Publication Data

US 2008/0313236 A1 Dec. 18, 2008

(51) Int. Cl.
*G06F 17/30* (2006.01)
(52) U.S. Cl.
USPC ............ 707/713; 707/802; 709/218; 709/238
(58) Field of Classification Search
USPC ......... 707/200, 741, 780, 640, 713, 716, 740, 707/802; 711/162; 709/218, 238
See application file for complete search history.

(56) References Cited

U.S. PATENT DOCUMENTS

| 5,706,467 | A  | * | 1/1998  | Vishlitzky et al. | 711/129 |
|---|---|---|---|---|---|
| 6,718,410 | B2 | * | 4/2004  | Slater | 710/66 |
| 6,779,057 | B2 | * | 8/2004  | Masters et al. | 710/55 |
| 6,851,011 | B2 | * | 2/2005  | Lin | 711/4 |
| 7,003,619 | B1 | * | 2/2006  | Moore et al. | 711/102 |
| 7,116,736 | B2 | * | 10/2006 | Blaum et al. | 375/354 |
| 7,350,041 | B1 | * | 3/2008  | Armangau et al. | 711/162 |
| 7,590,807 | B2 | * | 9/2009  | McGovern et al. | 711/159 |
| 7,599,971 | B1 | * | 10/2009 | Hagerstrom et al. | 707/640 |
| 2003/0001036 | A1 | * | 1/2003 | Beavers et al. | 242/334.5 |
| 2004/0215872 | A1 | * | 10/2004 | Dawson et al. | 711/111 |
| 2005/0114614 | A1 | * | 5/2005 | Anderson et al. | 711/162 |
| 2005/0283495 | A1 | * | 12/2005 | Wu | 707/780 |
| 2007/0266059 | A1 | * | 11/2007 | Kitamura | 707/640 |
| 2008/0244196 | A1 | * | 10/2008 | Shitomi et al. | 711/147 |

\* cited by examiner

*Primary Examiner* — Shahid Alam
(74) *Attorney, Agent, or Firm* — Dergosits & Noah LLP; Todd A. Noah (57) ABSTRACT

A process for organizing data objects backed up from a content-addressed storage systems is disclosed. Content-addressed storage systems back up data objects in a flat directory, labeling them with non-intuitive user-unfriendly content addresses. Such directories can be large and difficult to browse, making selective recovery of desired data objects inefficient and laborious. When the content-addressed storage system is further archived to a secondary storage device, such as tape, navigation of archived data objects is especially tedious and difficult. An embodiment of the present invention enables easy navigation of a data object directory created by building a pseudo-file structure as content addressed data objects are archived to a secondary backup device. The file structure of the data object director is based upon timestamp metadata extracted from each data object, resulting in a navigable directory tree that is more intuitive and user-friendly.

10 Claims, 6 Drawing Sheets

PROCESS FOR CATALOGING DATA OBJECTS BACKED UP FROM A CONTENT ADDRESSED STORAGE SYSTEM

TECHNICAL FIELD

The present invention relates generally to the backup, storage and recovery of data objects in a computerized file system, and specifically, to a process for cataloging content-addressed data objects during storage using a dump-based file system.

BACKGROUND OF THE INVENTION

Many organizations are upgrading their data backup systems to content-addressed storage ("CAS") systems like Centera®. (Centera is a trademarked product owned and marketed by the assignee of the present invention.) In a CAS system, content addressed data objects are not organized in a multi-tiered directory file structure, but rather all data objects are stored in a flat, single-tiered directory without folders or sub-folders. As such, each data object on a CAS storage system has a single name, without any additional path, directory or folder information. In contrast, traditional location-based backup system files are stored within tiered folders, and file names often have references to a path or folder. Because a flat directory structure provides faster data object backup and retrieval, CAS storage systems offer a more efficient means of archiving, backing up, storing and retrieving data.

In a CAS storage system, data object names are provided by the system based upon the content and/or context of the file, using associated metadata such as creation date, creator name, project name, etc. Any alteration of a data object will change its content and/or associated metadata, and thus its name. The altered data object is then backed up as a new data object rather than overwriting a pre-existing data object. Thus, this taxonomy not only makes the archiving and organization of backup files more efficient, it also backs up of all versions each file. However, the use of a flat directory with system-provided data object names makes it difficult for the user to navigate the directory to locate and restore individual data objects.

This difficulty usually appears when an organization wishes to perform a secondary backup of its primary CAS storage system to a secondary backup system, and when the user subsequently needs to restore data objects from that secondary backup system.

Secondary backups for archiving primary CAS storage systems are managed by backup utility software applications known as data mover agents (DMA). One backup command executed by a DMA to initiate secondary backup of a CAS storage system to tape is the "dump" command, which is a computer instruction that causes the CAS storage system to dump its contents to a tape server or equivalent storage device. However, as noted previously, CAS storage systems retain data objects in a single flat directory, organized by path-less data object names, and not by the original user-defined file names. A dump-based directory (typically called a "file history") appears as a list of data objects with names of apparently long strings of random characters that are nonintuitive to the user. A user looking at this directory of archived data objects will have a difficult time finding desired individual files for recovery because they will not have the original file names that the user is familiar with.

Additionally, certain DMA applications require certain fields in the metadata of the data objects. The primary CAS storage system may not generate these required fields, making the backup of some primary CAS storage systems incompatible with certain DMA applications. For example, some DMA applications manage data objects by using inodes, which is an integer number added to the file as additional metadata that is uniquely associated with each data object. Such a DMA cannot archive data objects from a CAS storage system that does not have inode data in their metadata files.

BRIEF DESCRIPTION OF THE FIGURES

FIG. 4 is an exemplary screenshot of a graphical user interface using one embodiment of the present invention.

DETAILED DESCRIPTION OF THE INVENTION

The following description is directed to a process for cataloging data objects that are backed up from a content addressed storage (CAS) system. CAS systems will often be used as a primary backup system, and users will back up, or archive the primary CAS system so that a secondary store of data is available in case of emergency or audit. Typical secondary backup systems include magnetic or optical tape devices, CD-ROM, DVD-ROM, or other high-density data object storage media. One skilled in the relevant art will appreciate that there are a number of CAS storage systems and secondary storage systems available, and that while the present invention is described in use with particular systems, these systems are merely exemplary and not meant to be limiting in any way.

As described herein, data objects are known in the lay vernacular as files. However, data objects are also known as blobs, or binary large objects. Data objects stored in a location-based system have file names given by the user and associated with path and directory information. Data objects backed up on a CAS system are addressed by the CAS system based on the data objects' content, rather than the original user-created file names. The name, or clip ID, for a data object is typically random in appearance, such as "2T3BMRTACMTBCeB8K3QPT0142UQ." There are no tiered file directories on a CAS system. Rather, all data objects are stored in a single flat data object name directory, which can often include the names of thousands or millions of data objects. While the use of a single filename and a single flat directory allows a CAS system to organize more efficiently than a traditional file system with location-based file paths and multiple directories, it makes it difficult for the user to navigate and identify specific data objects for recovery. The data object names are not user-friendly and do not carry the original file names, nor do CAS data object names retain the original file path format. One embodiment of the present invention provides a navigable catalog for the data objects using the metadata associated with each data object, and exporting the catalog to backup utility software applications that will use the catalog to create a graphical user interface that may take the form of a navigable index. In one embodiment of the present invention, data objects are still displayed as organized by their individual names, but appear within folders and subfolders created using, for example, timestamp metadata.

Figure 1:
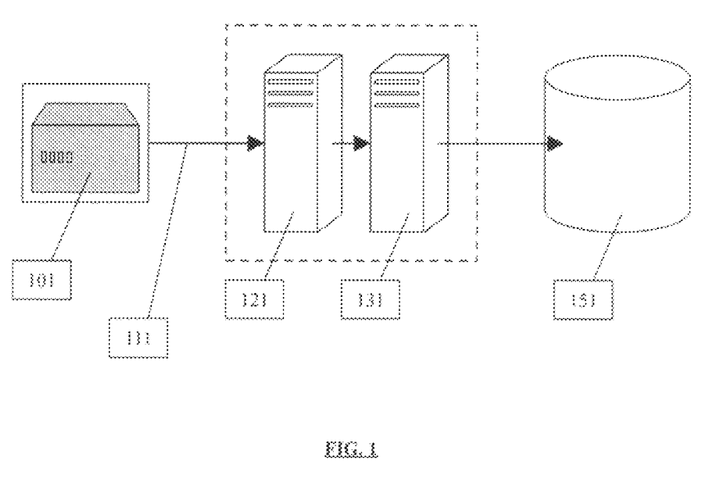
FIG. 1 is an exemplary block diagram showing various components of a CAS storage system, according to one embodiment of the present invention.
Figure 2:
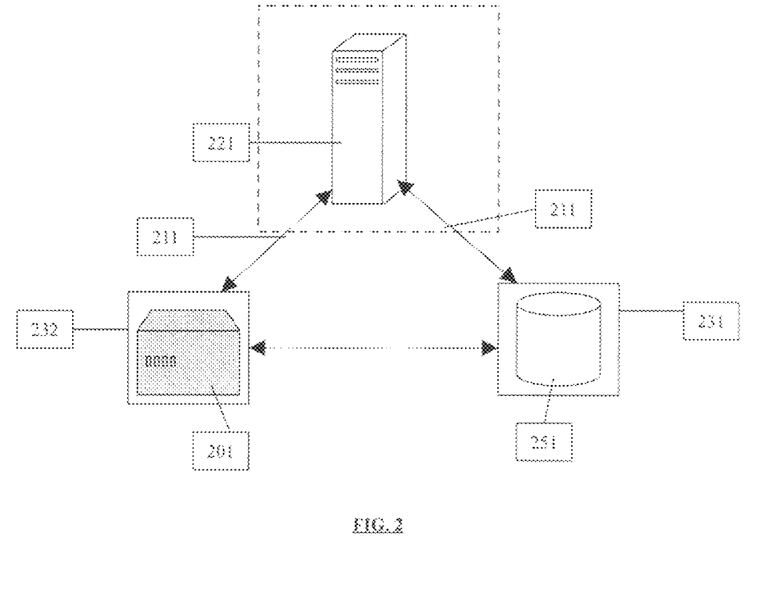
FIG. 2 is an exemplary block diagram showing an alternative setup of various components of a CAS storage system according to one embodiment of the present invention.

FIGS. 1 and 2 illustrate the hardware components that are common for the different embodiments of the present invention, which will be described first. FIG. 1 illustrates the four basic components of a system utilizing an embodiment of the present invention. These include a data source 101, a DMA 121, a host server 131 and a data destination or storage device 151. One skilled in the relevant art will appreciate that the components shown are merely block representations of an embodiment of a basic CAS system, and that many systems are available that have more components than those illustrated.

Data source 101 can be a standalone computer or a computer that is part of a distributed server system, so long as it can access the other basic components of the CAS system over a network. Data source 101 can also be the storage device to another CAS system or similar network-accessible storage device. One skilled in the art will recognize that the terms "network," "computer network," and "online" may be used interchangeably and do not imply a particular network embodiment or topography. In general, any type of network (e.g., LAN, WAN, SAN or Internet) may be used to implement the online or computer networked embodiment of the present invention. The network may be maintained by a server, or serverless. Similarly, any type of protocol (e.g., HTTP, FTP, ICMP, UDP, WAP, SIP, H.323, NDMP, TCP/IP) may be used to communicate across the network.

In one embodiment, data source 101 is contains the data objects that a user or administrator wishes to archive. Data source 101 can also be connected to a display for showing the progress of a backup or restore to the CAS system. According to one embodiment, data source 101 will also display the graphical user interface of the catalog feature of the present invention. Data source 101 is connected via network 111 to DMA 121. In one embodiment, DMA 121 is a backup utility software application that performs the physical operations of the CAS system, that is, sending commands and instructions to the host server computer 131 to initiate backup or recovery operations. In another embodiment, DMA 121 also provides the graphical user interface that displays the catalog aspects of the present invention.

Host server computer 131, which is connected to DMA 121 via network 111, contains the backup and recovery software module (BRM) that accepts the instructions and/or commands from DMA 121. In one embodiment, DMA 121 communicates and transports data through the BRM of host server 131 using Network Data Management Protocol (NDMP). Host server 131 is NDMP compatible. One skilled in the relevant art will recognize that the NDMP protocol is a well-known protocol adopted in the backup device industry that standardizes some of the syntax and commands between backup hardware and software products.

According to one embodiment, DMA 121 is connected to host server 131 over network 111. In another embodiment, DMA 121 is contained within host server 131 so that the BRM interacts directly with DMA 121. DMA 121 performs the movement of data assets to storage device 151, whether it be a CAS storage server, a tape server storage device, or some other NDMP-based network-attached storage device.

The present invention is not limited to any specific combination of hardware circuitry and software, nor to any particular source for the instructions executed by the server or data sources. For example, in another embodiment, DMA enables archive operations between primary and secondary backup devices. In FIG. 2, DMA 221 is connected over network 211 to a primary backup 201. Communication between DMA 221 and primary backup 201 is enabled by an NDMP compatible host server 232. Additionally, DMA 221 is connected over network 211 to a secondary backup 251. Communication between DMA 221 and secondary backup 251 is enabled by a second NDMP compatible host server 231. In this embodiment, the user accesses DMA 221 to initiate archiving of data objects on primary backup 201 to secondary backup 251. DMA 221 will bridge communications between primary host server 232 and secondary host server 231, and data objects will be streamed from primary backup 201 to secondary backup 251, without requiring that DMA 221 handle the actual data objects. According to this embodiment, DMA 221 will still produce cataloged data object information for the user interface.

In another embodiment, data objects are selected for archive on data source 101. These data objects are identified to host server 131. The BRM on host server 131 locates the selected data objects within data source 101 and captures the metadata associated with each data object. It is a feature inherent in CAS storage systems that each data object has NDMP-formatted metadata based upon associated data object attributes. The metadata can include user-defined attributes, and/or attributes defined by the software application that created or most recently modified the data object.

Figure 3:
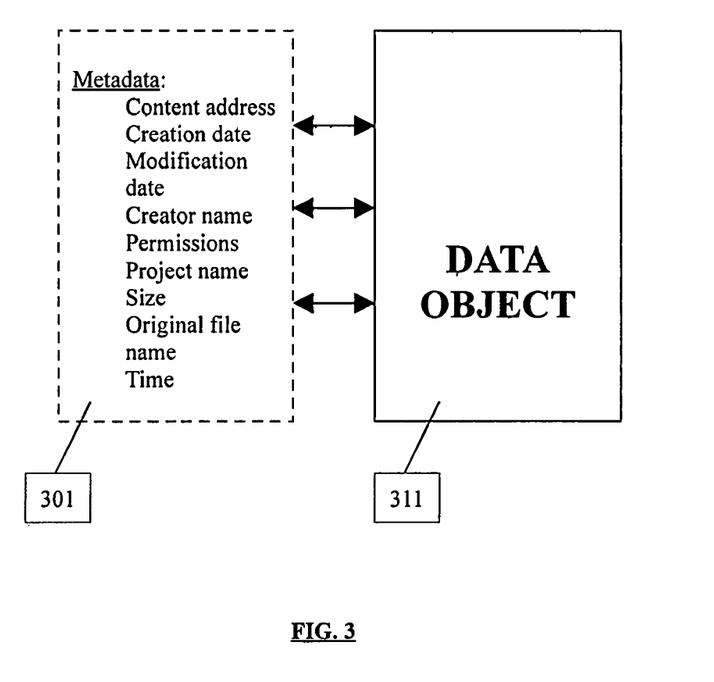
FIG. 3 is an exemplary block diagram depicting the attributes of a data object according to one embodiment of the present invention.

FIG. 3 illustrates some metadata 301 associated a data object 311. The BRM can use the metadata 301 to create a pointer for the data object. The pointer, referred to here as a clip ID, may later be referenced by the user for recovering and restoring the backed up data object. Once the clip ID is created, the backup and recovery module (BRM) instructs the DMA 121 to transfer the data object to the storage device 151. The metadata is stored by the DMA 121 in a separate memory buffer that is later used to enable the cataloging function of the present invention. The DMA will perform a high-speed transfer, or "stream," of the data objects to the storage device 151. The stream may be a single thread of data, but in some cases, data objects can be streamed simultaneously in multiple threads. In either case, the storage device 151 accepts the data objects and stores them.

As described previously, metadata 301 associated with data object 311 contains user-defined and/or application-generated information about data object 311. Metadata 301 also includes the content address for data object 311 that is generated by the CAS system upon initial data object creation. Each data object 311 will have its own content address, just as each data object 311 will have its own clip ID. In another embodiment, the content address and the clip ID are the same string of characters.

In one embodiment of the present invention, metadata 301 for each data object 311 is stored in DMA 121 as an XML file that contains physical location of or pointers to its associated data object. In this embodiment, the clip ID from the XML file is transmitted to the BRM so that when the user wishes to restore a specific data object, the user sends instructions to host NDMP server 131 of FIG. 1 that will cause the BRM within the host server to communicate with DMA 121. DMA 121 will use the clip ID to locate the specific data object to which the clip ID refers. Through the BRM, host server 131 will instruct DMA 121 to transfer the proper data object back to the data source 101, or to any other client computer on the network 111. DMA 121 will use the BRM's instructions by linking the identified clip ID to the proper data object, and will stream it back from storage device 151 to data source 101. This stream can be a single thread of data objects, or a multiple thread of data objects.

Regarding the software aspects of the present invention, DMA uses the metadata extracted by the BRM during backup to create and display a catalog of the stored data objects. The program product that executes the cataloging can be made part of the host server's BRM, or can be contained in an application programming interface (API) within the host server, DMA or any other component along the archive path. Creating an effective catalog involves extracting certain metadata or other available identifying markers from each data object's metadata file and organizing the extracted information into a pseudo-directory tree or index. In one embodiment of the present invention, this directory tree or index is displayed as a graphical user interface, similar to Windows Explorer or Mac OS X Finder. This embodiment mimics common graphical user interfaces by exporting the information to the DMA, which uses it to display a navigable series of pseudo-directories based upon the extracted metadata (i.e., a navigable index).

In one embodiment, a data object's timestamp metadata includes information on when the data object was created or last modified. According to one embodiment, this information includes the year, month, date and hour for that particular data object. This can be further enhanced by the addition of information relating to the name of the data source from where the data object originated, and the hardware identification number of the storage device to where the data object was backed up, or the hardware identification number of the server where the data object was backed up from.

One skilled in the relevant art will appreciate that other information can be utilized and applied in order to mimic further file system directories. Thus, as an illustrative example, for a data object having the data object name, 00AKIIG2Q4P9Ue5R85E4, saved or last modified at 10:00 AM on Jan. 22, 2007, that is stored on a CAS-based storage system named "centera4" device having a hardware ID of "7acc41bc-1dds-11b2-9879-8b259", a pseudo-file path might appear as: /centera4/7acc41bc-1dds-11b2-98798b259/2007/01/22/10/00AKIIG2Q4P9Ue5R85E4. As shown, each segment of metadata for each data object is strung together to form a pseudo-file path that can be displayed on a user interface like Windows Explorer or Mac OS X Finder, where each segment of metadata mimics a folder in a file directory. One will appreciate that this particular data object is unlikely to be the only data object created or last modified between 10:00 and 11:00 AM on Jan. 22, 2007, and thus the pseudo-directory for that hour may contain a number of data objects. On the other hand, it will be appreciated that the pseudo-folder for 10:00 AM will contain much fewer data objects than a list of all data objects within the /centera4 flat directory.

Another embodiment of the present invention provides a process for taking the metadata extracted from each data object during archiving to create a graphical user interface viewable by a user. FIG. 4 illustrates a screenshot of an exemplary graphical user interface from a DMA that has used the catalog information. One will appreciate that FIG. 4 resembles the user interface of familiar programs like Windows Explorer. On the left side of the screen, pseudo-file folders have been created using the timestamp data associated with a data object. Frame 401 illustrates a pseudo-folder of data objects created or last modified at 10:00 AM on Jan. 22, 2007. On the right side of the screen is a list 411 of data object names 411 for that hour. One will appreciate that these data objects were backed up at 4:38 PM on Mar. 22, 2007; however, this is not the timestamp metadata that was used to create the pseudo-directory tree in frame 401. Frame 401 also refers to other extracted metadata used to construct the pseudo-directory tree.

The archived data objects correspond to pseudo-folder /5acc41bc-1dds-11b2-9879-8b259. In one embodiment, the pseudo-folder name is the hardware identification number of the server where the data objects were archived from. In another embodiment, this is the system provided name for the project to which the data objects refer. One will appreciate that this text string is common to all the data objects in pseudo-subfolder /2007 in list 411, and provides added segmentation and pseudo-path structure to the graphical user interface. Similarly, /centera4 is the parent pseudo-folder for /5acc41bc-1dds-11b2-9879-8b259. Parent pseudo-folder centera4 is an example of additional segmentation, and may refer to the primary CAS storage system where the data objects were originally backed up. Parent pseudo-folder centera4 is within a pseudo-mount point /C:, which is further organized in /dulbvijayak.corp.emc.com and might be the network address for the CAS storage system.

One will appreciate that there are many possible pseudo-path segmentations that can be used by the present invention to create the directory tree in frame 401. One will also appreciate that the data objects are not actually located in a directory or folder as shown in FIG. 4, but that these are visual representations of a virtual file system created using the metadata from each data object listed in 411. Without this embodiment of the present invention, all of the data objects shown in 411 of FIG. 4 would be contained in a flat directory in /centera4, and that locating specific data objects without the extracted and exported metadata would require searching through a list of all data objects on /centera4. Using one embodiment of the present invention, if a user knows when a desired data object was created or last modified, the user can narrow down the recovery of the desired data object to within the hour. Thus, referring to list 411 of FIG. 4, the user would only have to recover and look through 165 data objects, rather than the entire contents of a flat directory from /centera4, which could potentially refer to over a million data objects.

The NDMP protocol permits backup and recovery using two different methods: tar file-type backups and backups using the "dump" command. The specific type of method that is used depends upon the type of DMA used to manage the backup. The present invention has already demonstrated its versatility in a number of tar file-based storage environments. However, dump-based DMA applications do not work in the same fashion. Dump-based DMAs manage data objects that have been associated with individual inodes. Inodes are typically understood as data structures having information about a particular data object to which it refers. The inode data structure can include an integer number corresponding to a specific data object. As such, one embodiment of the present invention adds functionality to certain dump-based DMAs.

The issue with DMAs that utilize inode numbering is that not all CAS storage systems apply the same convention. Some CAS storage systems do not even use inodes at all. Thus, data mover agents and other data backup utility software programs will not be able to manage, let alone archive the data objects on those CAS storage systems. The inode metadata required by those DMAs will not exist. In these circumstances, an embodiment of the present invention permits cataloging of data objects while incorporating a pseudo-inode numbering scheme to work with those particular data mover agents. This embodiment works with both single thread and multiple thread data backup methods, with slight variations depending on the type of streaming. The inode number is only used to ensure compatibility with these particular data mover agents. The inode number is not used to organize the data objects or create the cataloged index ultimately displayed on a graphical user interface.

According to one embodiment of the present invention that involves a single stream dump-based backup, the process for creating an index of file objects is accomplished by creating a pseudo-inode number for each backed up data object. This is illustrated in the flowchart depicted in FIG. 5. In a first step 501, the user identifies those data objects on the CAS primary storage system that need to be archived. These can be selected data objects or a complete backup of all data objects. In a second step 505, the backup and recovery module (BRM) for the host server associated with the CAS primary storage system will prepare the selected files. Computer instruction code will create and assign each identified data object with a pseudo-inode number that is compiled into a list. This is depicted in step 510, where the first data object encountered by the BRM will be assigned a first inode integer that is added to the already present metadata for the data object. The DMA will be able to refer to this pseudo-inode for each data object. During this step 510, the creation/last modification timestamp, data object name and possibly other identifying metadata for the data object will be extracted and stored in a temporary memory buffer. This task can be performed by the backup and recovery module in the host server, or by the DMA. One will appreciate that rather than time of creation or last modification, a catalog can also be created using time of archive or backup. Once the appropriate metadata has been identified and extracted, in step 515, the DMA organizes the metadata to note which data objects were created/last modified in a certain hour for a certain day of a certain month for a certain year. In step 520, the data objects are streamed to the data destination, typically a secondary storage device. Finally, in step 525, the extracted timestamp metadata is returned from the memory buffer to the DMA, which uses them to create the pseudo-directory path structure depicted in FIG. 4. Since a single stream backup thread only sends each data object one at a time to the storage device, the DMA or other enabled component in the storage system can easily identify and organize those data objects sharing common timestamp metadata. One will appreciate that the process by which a DMA creates a graphical user interface will vary, since each vendor's DMA will have its own proprietary method of providing a graphical user interface.

In another embodiment, a pseudo-inode number for each data object is generated and used to ensure that the archive of data objects from a CAS system to tape is compatible with certain types of data mover agents on the market. FIG. 6 sets out in more detail the steps when the pseudo-inode number is generated. In one embodiment, this entire process occurs contemporaneously with the archiving process illustrated in FIG. 5. While FIG. 6, and the following description discloses a certain order of steps taken during the implementation of the present invention, one will appreciate that these steps can be rearranged depending upon the hardware and software components of the archive system.

Figure 5:
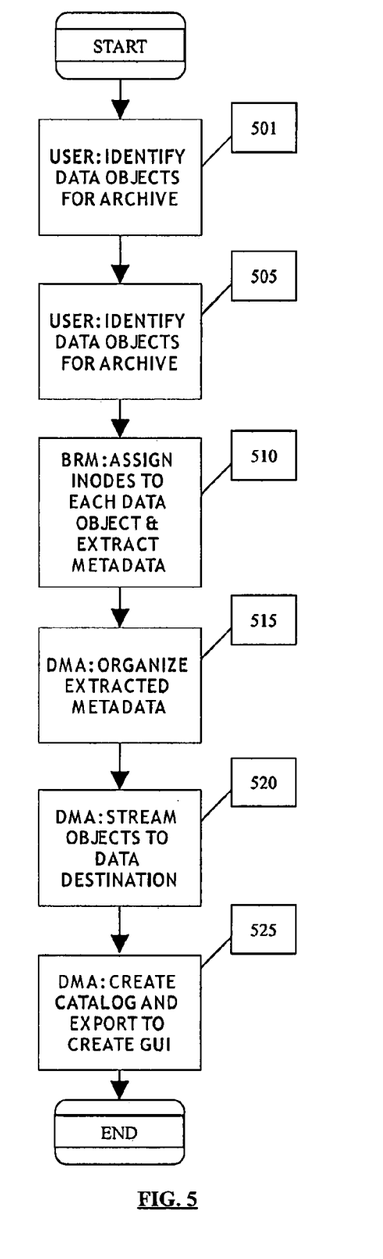
FIG. 5 is a logical flow diagram illustrating the steps involved in one embodiment of the present invention.
Figure 6:
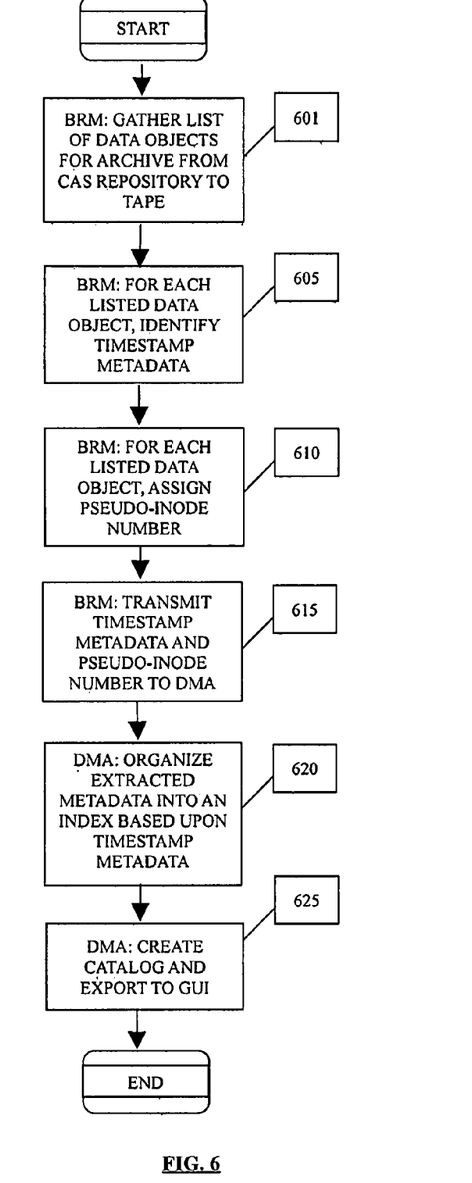
FIG. 6 is a second logical flow diagram illustrating the steps involved in one embodiment of the present invention.

As in FIG. 5, step 601 of FIG. 6 involves data objects that have been identified for archiving to tape. In one embodiment, the BRM gathers this list, which may be provided by a user of the system or as part of an automated archive program, and identifies the associated metadata for each listed data object. In this embodiment, the timestamp metadata is used to create the catalog, so the BRM will be tasked with identifying and extracting the appropriate timestamp metadata in step 605. At this stage, in step 610, the BRM can also create and assign an incremented integer pseudo-inode number for each listed data object. This additional data structure can be inserted into the extracted metadata for each data object, or can be associated with the data object in some other fashion. Either way, each data object will be labeled with a pseudo-inode number so that the DMA will be able to handle the data object, even though the originating CAS system does not use the inode convention. In a single-thread data object stream, the pseudo-inode number can be added as each data object is encountered by the BRM. The metadata and pseudo-inode numbers for each data object will be transmitted to the DMA in step 620. In one embodiment, the DMA uses the pseudo-inode numbers within its own system to handle, manage and organize the data objects, but the timestamp metadata is solely used to create catalog aspect of the present invention. In step 625, the DMA organizes the timestamp metadata by time to create a catalog. The DMA then exports the catalog data for its graphical user interface, which varies by DMA vendor. As noted, one will appreciate that FIG. 6 is merely an example of what steps are taken to create a catalog using a CAS system and a DMA that requires inodes.

The previously described embodiment works when data objects are streamed in a single thread. Because each data object is transmitted individually, the DMA can automatically extract metadata from each data object individually. However, single-threaded streams are not the only means to stream data objects to a storage device. Some organizations are implementing multiple threaded streams, which in a dump-based file system, permit the simultaneous transfer of multiple data objects at once. In these circumstances, the BRM will not encounter data objects one at a time, because data objects may be transmitted simultaneously in a multiple-threaded stream. The pseudo-inode numbering scheme described above is designed to increment inode integers as each data object is encountered.

To handle multiple threaded streams of data objects, another embodiment of the present invention provides for the creation of a separate memory buffer. This separate memory buffer is used to store timestamp metadata of data objects during backup to the secondary storage system. When the dump command is issued for a multiple thread file system, the system will extract timestamp metadata for all of the data objects selected for archiving. The timestamp metadata may incorporate the time of creation or last modification for a data object, but one skilled in the relevant art will appreciate that the present invention can easily be modified to use the timestamp information for the time of archiving or backup. In either case, the system organizes the data object chronologically by timestamp, such that all those data objects that were created, last modified, or backed up in the same year, month, day and hour are kept together in the memory buffer. Once all the "same-hour" data objects are found, they can be streamed to the storage device. Thus, even if all the data objects are streamed in multiple threads such that they become separated, they will still correspond to the same hour. If the DMA requires inode numbers be associated with these data objects, then an embodiment will create and assign them respective pseudo-inode numbers (step 610 in FIG. 6). However, these inode numbers serve to promote compatibility with the inode-requiring DMA and are not used to create a catalog of the data objects.

Once all the data objects corresponding to the same hour are archived, the CAS storage system will then stream the next batch of data objects that correspond to another hour. The memory buffer is refreshed with the new set of clip IDs for the new "same-hour" data objects, and these data objects are transferred to the storage device as a multiple thread stream. For example, those data objects whose extracted timestamp metadata reveal they were all created on the exact same day at 4:00 PM will be transmitted to the storage device using multiple thread streaming, then all those data objects that were created at 5:00 PM will be streamed. Once the archiving is complete, the DMA will use the extracted timestamp metadata to create the graphical user interface as shown in FIG. 4. In one embodiment, regardless if the archive is single thread, multiple thread, dump-style or even a tar-based file system, the graphical user interface will look the same.

Another embodiment of the present invention provides tools used during the restoration of archived data object from a secondary backup device. As shown in list 411 of FIG. 4, each data object has a small dialog box next to its name. According to this embodiment, if a user wishes to restore specific data objects, the user may select them here. Similarly, by using the directory tree embodiment in frame 401 of FIG. 4, the user may navigate to a certain date, and even a certain hour, to restore a whole batch of archived data objects. Thus, an embodiment of the present invention uses an interface that provides for easier identification of data objects that were last modified at a certain hour.

The above examples demonstrate how embodiments of the present invention create a catalog of data objects archived from a CAS storage system using a number of different backup methodologies, including traditional location-based file histories, dump-style file histories, single-threaded backup solutions as well as multiple-threaded backup solutions. Although the present invention has been described with reference to specific exemplary embodiments, it will be evident that various modifications and changes may be made to these embodiments without departing from the broader spirit and scope of the invention as set forth in the claims. The preferred embodiment of the present invention has been taught with reference data objects originally backed up on a CAS storage system that are further archived on a tape storage device using a dump-based DMA. Other types of secondary backup systems may be used in conjunction with a primary CAS storage system, such as another CAS storage system, CD-ROMs or other long-term storage media. One skilled in the relevant art will appreciate that there are many alternative storage area networks that could implement the present invention without departing from the teachings of the invention. Accordingly, the specification and drawings are to be regarded in an illustrative rather than restrictive sense.

What is claimed is:

1. A process for creating a navigable index of data objects stored in a content addressed storage system, comprising:
   providing from a primary content-addressed storage system at least one data object for storage in a secondary content-addressed storage device, the data object having metadata associated therewith including at least one timestamp metadata about the data object;
   extracting, by a software module, the timestamp metadata associated with the data object;
   organizing the extracted timestamp metadata and the data object associated with the extracted timestamp data into an index based on the timestamp metadata; and
   displaying a navigable visual representation of the index on a user interface including virtual folders to group data objects stored in a flat directory of the secondary content-addressed storage device based on the extracted timestamp data.

2. The process of claim 1, wherein the extracted metadata is the data object's time of creation.

3. The process of claim 1, wherein the extracted metadata is the data object's time of last modification.

4. The process of claim 1, further comprising the additional step of generating an inode number for the data object and providing the inode number to the data mover agent module.

5. A process for creating a navigable index of data objects stored in a content addressed storage system, comprising:
   providing from a primary content-addressed storage system at least two data objects for storage in a secondary storage content-addressed device, the data objects each having respective metadata associated therewith including at least one timestamp metadata about each respective data object;
   extracting, by a software module, the timestamp metadata associated with each respective data object;
   organizing the extracted timestamp metadata and the data object associated with the extracted timestamp data into an index based on the timestamp metadata; and
   for those data objects with timestamp metadata corresponding to the same year, month, day and hour, transmitting those data objects to the secondary content-addressed storage device; and
   displaying a navigable visual representation of the index on a user interface including virtual folders to group data objects stored in a flat directory of the secondary content-addressed storage device based on the extracted timestamp data.

6. The process of claim 5, wherein the extracted metadata is each data object's time of creation.

7. The process of claim 5, wherein the extracted metadata is each data object's time of last modification.

8. The process of claim 5, further comprising the additional step of generating an inode number for each data object and providing the inode number to the data mover agent module.

9. A computer program product, comprising a non-transitory computer usable medium having a computer program code embodied therein, the computer readable program code adapted to be executed to implement a process for creating a navigable index of data objects stored in a content addressed storage system, the process comprising:
   providing from a primary content-addressed storage system at least one data object for storage in a secondary content-addressed storage device, the data object having metadata associated therewith including at least one timestamp metadata about the data object;
   extracting, by a software module, the timestamp metadata associated with the data object;
   organizing the extracted timestamp metadata and the data object associated with the extracted timestamp data into an index based on the timestamp metadata; and
   displaying a navigable visual representation of the index on a user interface including virtual folders to group data objects stored in a flat directory of the secondary content-addressed storage device based on the extracted timestamp data.

10. A process for cataloging data objects in backup operations for a content addressed storage system, wherein the data objects are stored in a flat, single-tiered directory without folders or sub-folders, and each data object has content and metadata associated therewith, comprising:
   identifying a plurality of data objects to be backed up from a first content-addressed storage system to a second content-addressed storage system;
   extracting selected metadata associated with each identified data object;
   creating an index for the data objects from the extracted metadata, the index including the extracted timestamp data and the data objects associated with the extracted timestamp data; and displaying a navigable representation of the index on a user interface including virtual folders to group data objects stored in a flat directory of the secondary content-addressed storage device based on the extracted timestamp data.

* * * * *